United States Patent [19]

Fage et al.

[11] Patent Number: 4,966,327
[45] Date of Patent: Oct. 30, 1990

[54] JET ENGINE PROVIDED WITH A THRUST REVERSER

[75] Inventors: Etienne Fage, Ramatuelle; Jean-Pierre Lair, Plaisance, both of France

[73] Assignee: The Dee Howard Company, San Antonio, Tex.

[21] Appl. No.: 263,224

[22] Filed: Oct. 27, 1988

[51] Int. Cl.⁵ .............................. F02K 1/10; F02K 1/12
[52] U.S. Cl. ........................... 239/265.29; 239/265.37; 244/110 B
[58] Field of Search ...................... 239/265.25, 265.27, 239/265.29, 265.37, 265.39, 265.41; 244/12.5, 23 D, 110 B

[56] References Cited

U.S. PATENT DOCUMENTS

| | | |
|---|---|---|
| 2,481,330 | 9/1949 | Neal . |
| 2,735,264 | 2/1956 | Jewett . |
| 4,093,122 | 6/1978 | Linderman . |
| 4,194,692 | 3/1980 | Dickenson ....................... 239/265.39 |
| 4,605,169 | 8/1986 | Mayers .......................... 239/265.29 |
| 4,641,782 | 2/1987 | Woodward ..................... 239/265.37 |
| 4,819,876 | 4/1989 | Thayer ........................... 239/265.25 |

FOREIGN PATENT DOCUMENTS

| | | |
|---|---|---|
| 2382593 | 9/1978 | France . |
| 2500537 | 8/1982 | France . |
| 2614939 | 11/1988 | France . |
| 636296 | 4/1950 | United Kingdom . |
| 800770 | 9/1958 | United Kingdom . |
| 808608 | 2/1959 | United Kingdom . |
| 987693 | 3/1965 | United Kingdom . |
| 1177687 | 1/1970 | United Kingdom . |
| 1332278 | 10/1973 | United Kingdom . |
| 1435946 | 5/1976 | United Kingdom . |
| 1524741 | 9/1978 | United Kingdom . |

Primary Examiner—Andres Kashnikow
Assistant Examiner—Michael J. Forman
Attorney, Agent, or Firm—Pollock, Vande Sande & Priddy

[57] ABSTRACT

A jet engine for an aircraft has a thrust reverser including one or more doors which define at least a part of the throat of the engine's nozzle. The engine further includes a latch mechanism for retaining the doors in a stowed position. The doors may be deployed for reversal of engine thrust, but are also capable while stowed of being pivoted in a limited way to change the cross-section area of the throat of the nozzle.

19 Claims, 9 Drawing Sheets

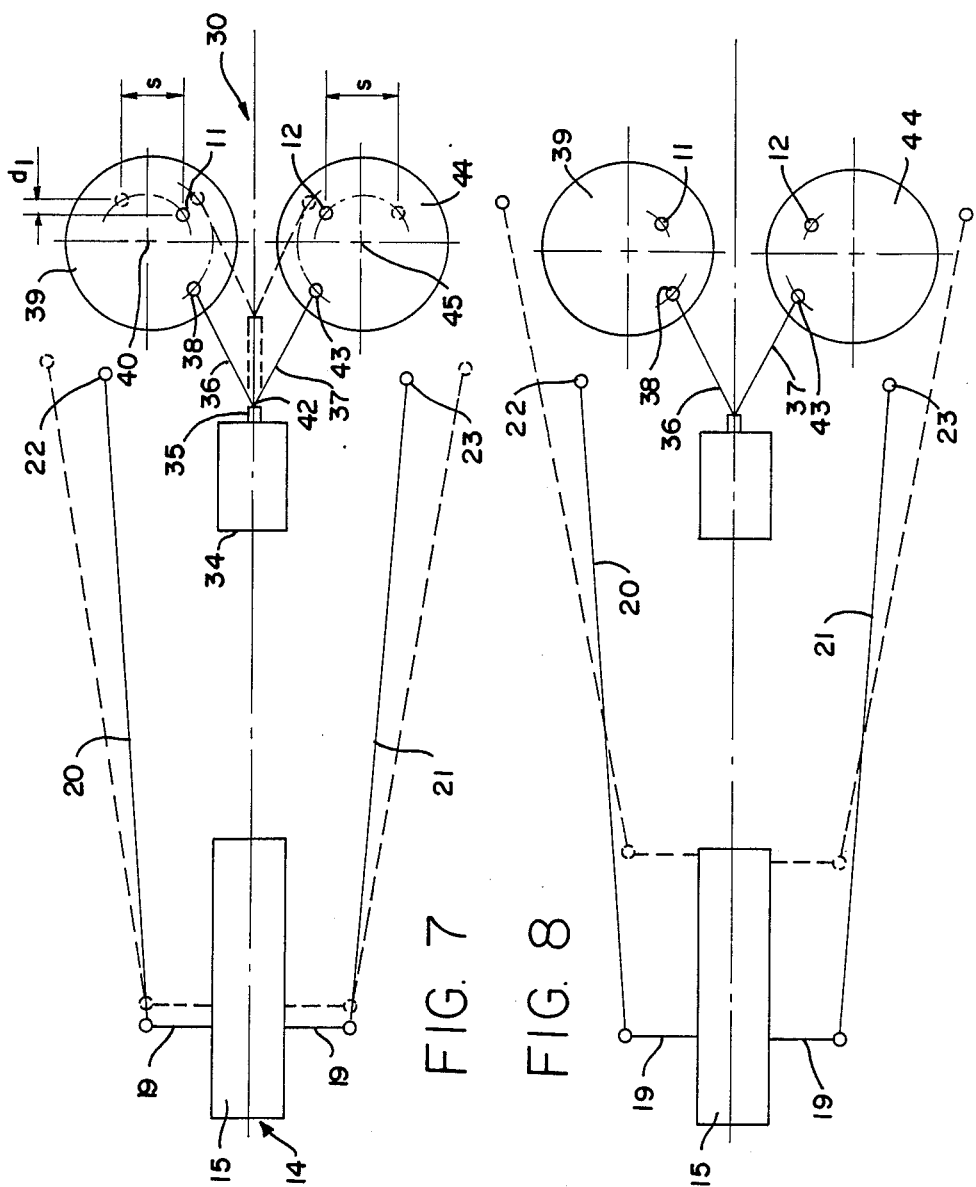

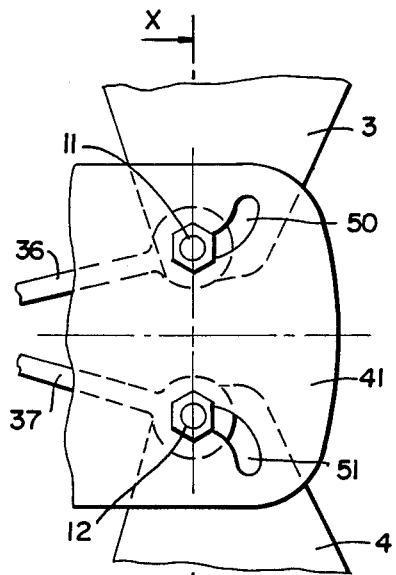
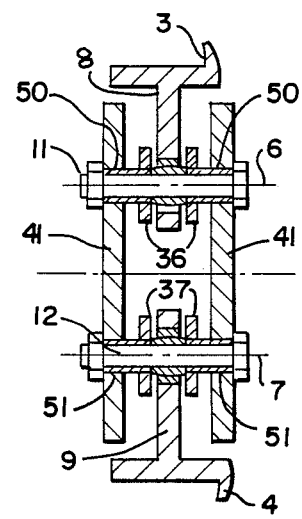
FIG. 9  FIG. 10
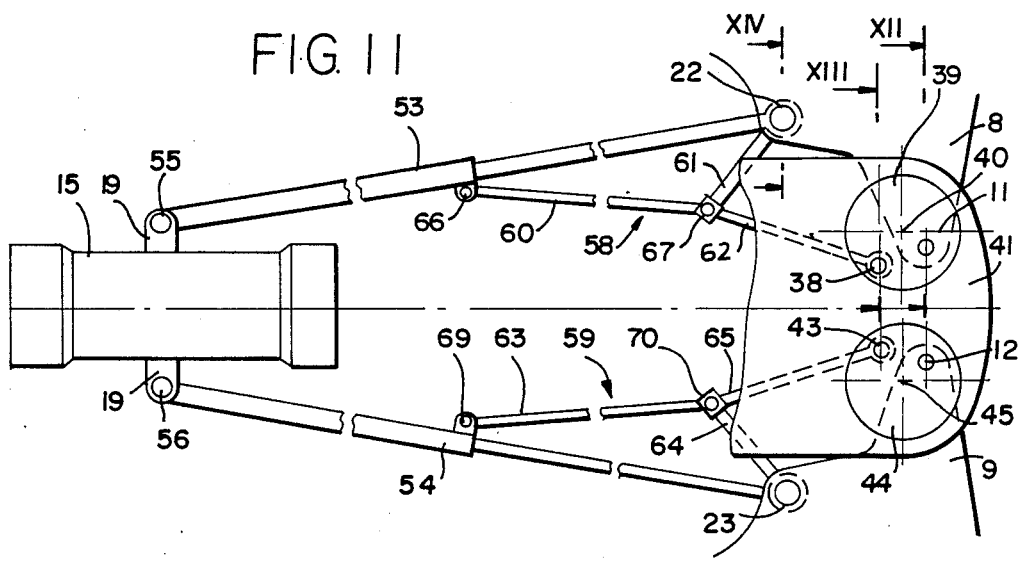
FIG. 11

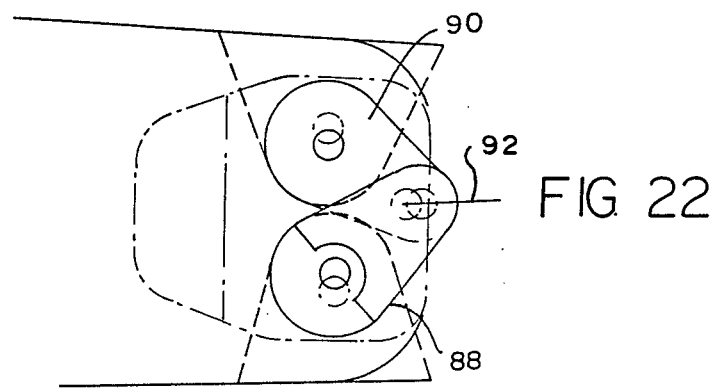
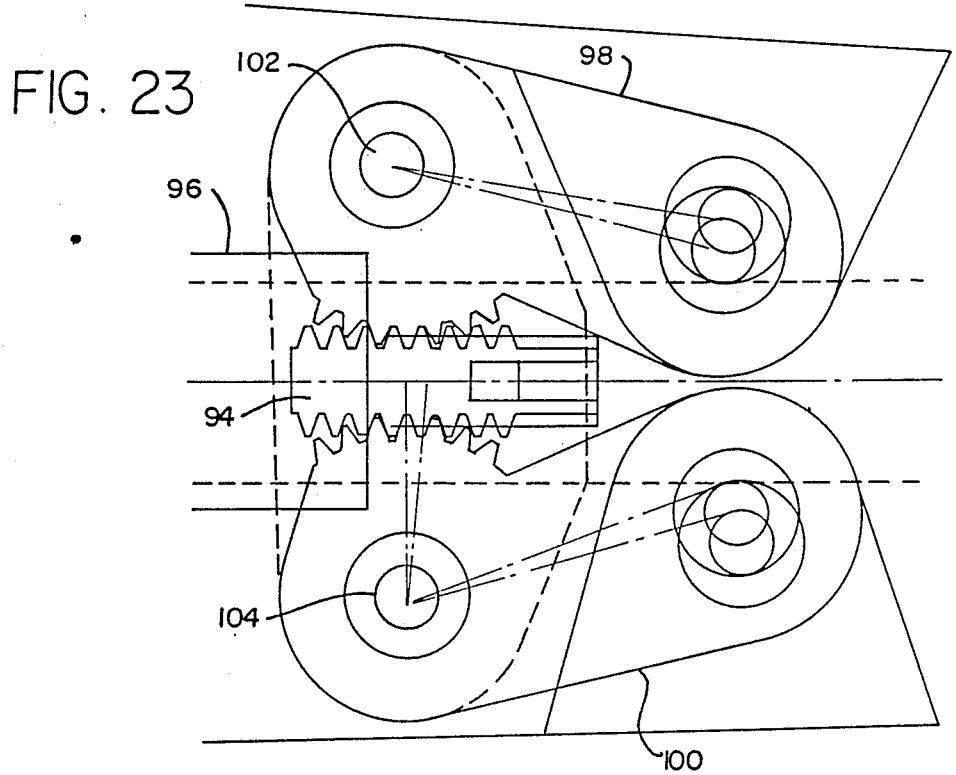

4,966,327

JET ENGINE PROVIDED WITH A THRUST REVERSER

FIELD OF THE INVENTION

The present invention relates to a jet engine for an aircraft provided with a thrust reverser. More particularly, it relates to a thrust reverser whose doors, while remaining in the stowed position, may be actuated to different positions to vary the geometry of the engine's ejection nozzle and thereby optimize engine thrust to suit different engine operating regimes.

BACKGROUND OF THE INVENTION

It is known that a jet engine may be provided with a thrust reverser to reduce the stopping distance of the aircraft, and to increase safety when braking on a wet or icy runway.

Generally, a thrust reverser comprises at least two doors mounted pivotally about axes transverse to the jet of the engine and disposed downstream of the jet's exhaust nozzle. Each of the doors is operable between a stowed position and a deployed position in which it is arranged transversely with respect to the jet stream.

Commonly, the doors are controlled by means of at least one longitudinal jack. Locking devices, for example hooks, are positioned at an upstream side of the doors to lock them in a folded position.

In spite of the advantages offered during the braking of an aircraft, thrust reversers may present the disadvantage of impairing the engine's thrust. In order to partially remedy these disadvantages, French Patent FR-A-2 382 593 suggests forming the thrust reversers so that, in their stowed positions, the interior volume of the doors provides a sleeve which defines the final portion of the engine nozzle including the throat. Since this sleeve serves in part as the engine nozzle, the nozzle proper can be shorter than is usual; as a consequence, the total length of the engine provided with a thrust reverser can be reduced, thereby saving weight.

It is known in the prior art to construct an aircraft jet engine with thrust reverser doors which are pivotable about fore and aft pivotal connections, as in the Dickenson U.S. Pat. No. 4,194,692, filed Aug. 5, 1977, and Linderman U.S. Pat. No. 4,093,122 filed Nov. 3, 1976. In both these patents, however, the thrust reverser doors do not, in any of their controllable positions, define the minimum cross-sectional area of the engine's ejection nozzle. In both of these prior patents, the minimum cross-sectional area is defined by a separate, variably convergent nozzle, with the thrust reverser doors being configured to provide, in the flight regime, a divergent nozzle.

SUMMARY OF THE INVENTION

According to the present invention, a jet engine of an aircraft having an ejection nozzle comprises:

One or more doors, each of which is pivotally mounted about an axis which is transverse to the jet of said engine and disposed to define the final portion of the engine nozzle including its throat. Each door can occupy a folded, non-reverse-thrust position. Also, the thrust reverser comprises actuating means for operating the doors simultaneously between their folded or stowed position and an extended or deployed, thrust-reversing position; and a retaining means is provided to maintain the doors in their stowed position.

This invention additionally provides for the doors, while remaining stowed, to be actuated in such a way that the throat area of the engine's nozzle may be varied, thereby optimizing the engine's thrust to suit a plurality of engine operating regimes. For example, the geometry of the nozzle can be adjusted to be at an optimum for takeoff or, alternatively, for cruise conditions.

Thus, due to the present invention, it is possible to vary, by means of the thrust reverser, the area of the throat of the ejection nozzle for the gas jet of the engine, while the doors are stowed, and when a direct jet is being output from the engine. As a consequence, by control of the reverser doors in their stowed position, one can better vary the throat area of the nozzle to correspond to the particular phase of flight of the aircraft.

It is known that, for example, the optimal throat area of the jet ejection nozzle of an aircraft during take-off is different from that for cruise flight. The difference is all the more important in that the ambient temperature of the engine during take-off is high, the engine thereby often attaining its temperature limit and thus being required to be limited in its rotation speed, so that its thrust must necessarily be reduced. When the engine is provided with a fixed nozzle, the engine operates with a fixed throat area whose cross-section corresponds to a compromise between the two optimal cross-sections for takeoff and cruise flight. When such a compromise is not acceptable, a variable throat area, for example of the "petal" type, is used. However, this type of variable nozzle has numerous mechanical complications, which also increases the engine's weight.

In the present invention, a geometric variation of the throat area of the nozzle, by using essentially the components already in existence on a turbo jet engine provided with a thrust reverser, can be obtained simply, thereby enabling the engine to function as closely as possible to the ideal conditions. Thus, the present invention makes possible the transformation of the drawbacks of a thrust reverser into an advantage.

It should be understood that in the engine according to the present invention, the throat area of the nozzle can have a plurality of values. Nevertheless, in a simple method and advantageous embodiment of the present invention, it is proposed that the actuating means be effective to displace the thrust reverser doors about downstream transverse axes, while maintaining the doors in a stowed position, between two positions which are both stable. One of the positions may, for example, provide a throat opening of the nozzle adapted for take-off, and the other position to a throat opening of the nozzle adapted for cruise flight.

The displacement means of the downstream transverse axes of the doors can be constructed in different ways. Generally, however, these means are either of the eccentric type or of the curved guiding type. However, control of the displacement means can also be effected differently. For example, the displacement means of the downstream transverse axes can include specific driving means acting in conjunction with the displacement means of each downstream transverse axis. In another embodiment, the displacement means for the downstream transverse axes can include the means to activate the doors.

The displacement means of the eccentric type of each downstream transverse axis can be constituted by at least one ring carrying, off-center and parallel about its axis of rotation, and on one side of the downstream transverse axis, the corresponding door; and on the other side, a spindle about which a connecting rod is moved under the action of a specific driving means, thereby permitting variation of the nozzle throat by rotating the rod of the orifice exit opening when the doors are in a folded, locked or retained position.

For example, when the driving means is in an inoperative state, the throat area of the nozzle has a cross-section corresponding in general to cruise flight. When the driving means is set to an operative state, the throat area of the nozzle is increased, corresponding in general to take-off in warm weather.

Thus, during operation of the driving means, the offcenter rings, carried by a flange, pivot in reverse about their respective axes due to the small rods, each of which is connected to one of the rings, which simultaneously control the angular displacement of each downstream transverse spindle with respect to the rotating axis of the corresponding ring.

This angular displacement of the downstream transverse spindle then causes a variation of the throat area of the ejection nozzle. At the start of rotation of the rings carrying the downstream transverse spindle, the doors are pivoted about their upstream transverse axes, which retract, in limited way, with respect to the locking means, while the doors remain locked by the locking means.

The variation of the throat area of the nozzle is effected by the driving means, by either a return spring or fluid feed, which changes then from an active position to an inactive position. The small rods then draw the rings in reverse rotation, one with respect to the other, thereby leading them back, about the downstream transverse axes, to their initial position corresponding to a predetermined throat area of the ejection nozzle.

The displacement means of the curved guiding type of each downstream transverse axis can be defined by an arched slot housed in a flange connected to the nozzle. The displacement means is capable of sliding into the downstream transverse axis by means of a small control rod driven by the driving means, thereby permitting variation, by sliding of the downstream transverse spindle into the slot, of the exit opening of the ejection nozzle for the gases when the doors are in a folded, locked position.

In another embodiment, the displacement means of the downstream transverse axes of the doors can be directly controlled by the actuating means of the doors, which advantageously include the existing parts in the thrust reverser.

In a general way, the actuating means permits the positioning of the doors to their folded position or their extended position. The actuating means includes a jack whose fixed part body or body is connected to the nozzle, and whose mobile part includes attachments or extensions, each of which is attached to an end of a rigid rod. The other end of each of the rods is attached in proximity to the downstream side of the corresponding door. Thus, when the mobile part is moved, after the locking means of the doors have been unlocked, the rods act on the doors so that the doors are returned to their extended configuration.

However, according to the present invention, it is not only necessary that the doors can occupy a stowed position or an extended position, but also that throat area of the nozzle, defined by the periphery of the downstream end of the doors in a stowed position, be variable between at least two different values.

In a method of the preferred embodiment, the rods are of the spring telescoping type, and can occupy either a minimal length, depending upon whether the jack is operative or not, while the doors are stowed. Moreover, attached to the rods are the respective displacement means of the downstream transverse axes. In this embodiment, the doors of the thrust reverser can occupy three different positions. The first position is that for which, on one side, the locking means lock the doors, and on the other side, the jack of the actuating means is inactive. The rods then have a maximum length corresponding to the displacement means of the downstream transverse axes of the doors, thereby effecting a predetermined throat area of the nozzle.

The second position is that for which, on one side, the locking means always locks said doors, and on the other side, the jack of the actuating means is active. The rods are then compressed to occupy a minimal length which draws in the displacement means and, as a result, the downstream transverse spindles of the doors, until the throat area of the nozzle attains an increased predetermined value.

The third position is that in which, on one side, the locking means, disposed on an upstream side of the doors, is freed of the doors, and on the other side, the jack of the actuating means is activated. The latter exerts then a force on the rods which do not compress, since the upstream axes of the doors have been unlocked and the doors have a natural tendency to open themselves under the effect of their own aerodynamic drag. As a maximum length and brake on the doors, which are extended about their respective downstream transverse axes, the displacement means then has a passive role.

In one embodiment, the displacement means of each transverse axis is constituted by connecting rod assembly which includes three small rods, respective ends of which are connected at the same point, and whose other ends are respectively connected to a telescopic rod, to a hinge spindle connecting the rods to the door, and to a ring rotatably pivoting in a flange connected to the nozzle. The ring carries, off-center and parallel to its rotatable axis, on one side, the hinge axle of the corresponding small rod, and on the other side, the downstream transverse spindle of the door.

Thus, when the principle actuating jack is put under pressure and the doors are in a folded and locked position, each telescopic rod is compressed, and its length reduced. At the start of their retraction, each of the rods draws its rod assembly having the three small rods, which in turn imparts a rotational movement to the ring, which is mounted off-center to the downstream transverse axis of the doors, the doors being then moved into a corresponding position so that the throat area of the nozzle is increased to a higher, predetermined value.

The return to the position corresponding to a lower throat area of the nozzle is effected by terminating the fluid pressure, being supplied to the principal activating jack. The telescoping rods thus relax, thereby returning to their initial maximum length and causing the return of the rod assemblies towards their initial position. The rod assemblies, in turn, pivot the rings, onto which the downstream spindles of the doors are mounted, thus moving them into the position to decrease the throat area of the nozzle.

In this embodiment, the off-center rings are arranged together in the flange connected to the nozzle. However, in another embodiment, the rings may be arranged at the respective downstream ends of the doors.

BRIEF DESCRIPTION OF THE DRAWINGS

The present invention can be best understood with reference to the figures hereinbelow. In these Figures, identical references designate similar elements.

FIG. 7 schematically shows the kinematics of the operation of the displacement means which permits variation of the throat area of the nozzle.

FIG. 8 shows the transition of the doors from the folded position to the extended position.

FIG. 9 shows another embodiment of the means illustrated in FIG. 4.

FIG. 10 is a cutaway view along line X—X of FIG. 9.

FIG. 11 shows another embodiment of the displacement means which permits variation of the throat area of the nozzle while the doors are in a folded position.

FIGS. 20 to 24 are additional examples of embodiments of displacement means for permitting variation of the cross-section of the exit opening.

DETAILED DESCRIPTION OF THE INVENTION

Figure 1:
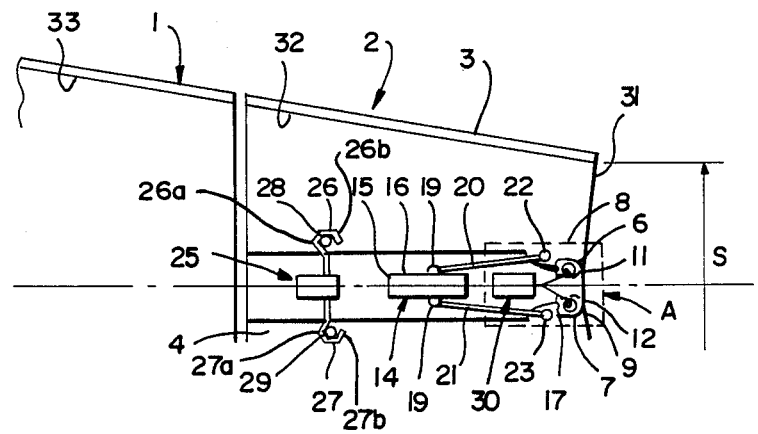
FIGS. 1, 2 and 3 are schematic views of a nozzle equipped with a thrust reverser according to the present invention, respectively occupying a first position for which the throat area of the nozzle, while the door is stowed, is at a minimum; a second position for which the throat area of the nozzle, while the doors are stowed, is at its maximum; and a third position in which the doors of the thrust reverser are deployed to effect thrust reversal.
Figure 2:
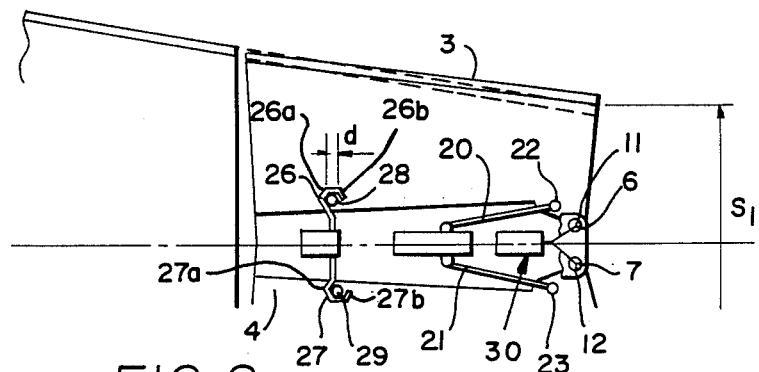
Figure 3:
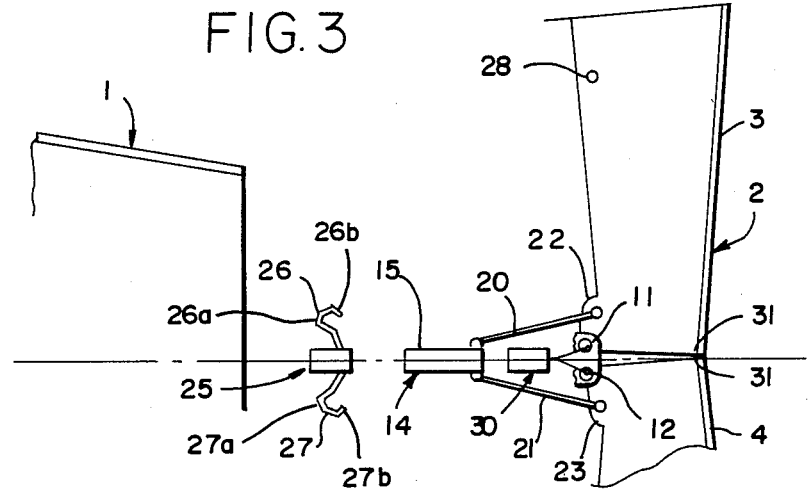

An ejection nozzle 1 of a jet engine of a single or double flow type is equipped with a thrust reverser 2 as shown in FIGS. 1-3. In the illustrated embodiment, thrust reverser 2 comprises two identical doors 3 and 4, the latter only partially shown, which form a part of nozzle 1, for the reasons previously discussed, when they are in a stowed position (FIGS. 1 and 2). When they are in a deployed position (FIG. 3), doors 3 and 4 actively participate in the proper braking of the aircraft since, due to the extended doors, the force of the jet delivered by the engine is reversed.

Doors 3 and 4 are mounted pivotally about axes 6 and 7, respectively, transverse to the jet of the engine, each axis being disposed downstream of the ejection nozzle 1. Each of the doors is coupled to opposite identical hinged braces 8 and 9, respectively. Identical hinged braces, invisible in the drawing, are positioned diametrically opposed to each of hinged braces 8 and 9.

Thus, door 3 can pivot about two downstream shafts 11 coincident with transverse axis 6, around which the respective braces 8 are arranged and carried by fixed, rigid arms 17 jointly with respect to the fixed nozzle, one of the arms being partially represented by its end. Likewise, door 4 can pivot in conjunction with door 3, around two downstream shafts 12 coincident with transverse axis 7, around which respective braces 9 are arranged, and carried by fixed, rigid arms 17.

Actuating means are designed to simultaneously operate doors 3 and 4 to their stowed position or their deployed position. These means, symbolized in FIGS. 1-3 by a box 14, are, for example, as described in Patent No. FR-A-2-500 537. Briefly, these means 14 include an actuator, such as a jack 15, connected by its fixed part 16 to a rigid arm fixedly coupled to fixed nozzle 1; whereas its active, displaceable part, not shown, comprises two actuating flanges 19, to each of which an end of a rigid rod, 20 and 21 respectively, is connected. The other end of each of the rods is connected to the brace of the corresponding door. Thus, rod 20 is connected at 22 to brace 8 of door 3, and rod 21 is connected at 23 to brace 9 of door 4.

In order to maintain doors 3 and 4 of the thrust reverser 2 in their stowed position, control locking means, symbolized by a box 25, is disposed at an upstream side of the doors. This means is also described, for example, in Patent No. FR-A-2 500 537. As is clear in FIGS. 1 and 2, hooks 26 and 27, disposed diametrically opposed to each other, retain upstream fingers 28 and 29, respectively, shown on corresponding doors 3 and 4. Hook 26 locks to upstream finger 28 of door 3; hook 27 locks, similarly, to upstream finger 29 of door 4.

According to the present invention, it is further envisioned that means 30, symbolized by a box, is provided to displace in common, and radially to the jet of the engine, the downstream shafts 11 and 12 of doors 3 and 4, when the doors are in a folded position and locked by locking means 25, so as to be able to modify the throat area of the nozzle. Examples of the preferred embodiment of these displacement means 30 are further described and illustrated with reference to FIGS. 4-19; whereas the representation of means 30 given with reference to FIG. 1-3 is only schematic for illustrating the operating principle.

Thus, in FIG. 1, doors 3 and 4 of thrust reverser 2 are in a stowed position and are both locked, via fingers 28 and 29 of the doors, by hooks (or hook-members) 26 and 27 of locking means 25. The internal passage 32 is an extension of the substantially identically conical convergent duct 33 of nozzle 1. The throat of the nozzle has a well-defined cross-section S, which is best adapted to a phase for the flight of an aircraft (for example during take-off or cruising).

The passage of FIGS. 1 and 2, corresponding to a modification of the throat cross-section of the nozzle, is effected under the action of specific actuating means which act on displacement means 30, so that hooks 26 and 27 of locking means 25 respectively lock upstream fingers 28 and 29 of doors 3 and 4, respectively. At the time of their activation, displacement means 30 draw simultaneously, and in an opposite sense according to a curved trajectory, the downstream transverse shafts 11 and 12 with respect to arms 17. At the same time, on the one side, the swinging of doors 3 and 4 is limited; and on the other side, upstream fingers 28 and 29 are displaced a distance "d" in hooks 26 and 27, respectively. Hinge spindles 22 and 23 of rod 20 and 21 equally undergo a displacement, the movable part of actuator jack 15 to which the rods are connected being relocated with respect to the stationary portion of the jack. The throat of nozzle 1 then has a cross-section S1 which is larger than the previous throat in this example of the embodiment, and which is thus better adaptable to one of the other phases of flight of an aircraft.

From FIGS. 1–3, it can be seen that each of hooks 26 and 27 has retaining portions 26a, 26b and 27a, 27b separating by the given distance "d" so as to afford space for the movement (to be further discussed with FIGS 7 and 8) of doors 3 and 4, respectively.

The initial position occupied by the doors in FIG. 1 is represented by dotted lines in FIG. 2.

According to the invention, the throat cross-section of the nozzle can be modified to adapt to the conditions of flight: for example, take-off and cruising, as required.

The position shown in FIG. 3 corresponds to the thrust reverser being properly deployed, with doors 3 and 4 being in an extended position. To obtain this position, control locking means 25 is unlocked, thus freeing upstream fingers 28 and 29 of the doors, and actuating means 14 is activated so that rods 20 and 21, connected to the movable part of jack 15, react with doors 3 and 4 by means of respective hinge spindles 22 and 23. The doors pivot simultaneously about the downstream transverse stationary shafts 11 and 12, until the desired position, corresponding to respective trailing edges 31 being in contact with one another, is attained.

The jack of actuating means 14 maintains the FIG. 3 position during the braking phase of the aircraft. The return of the doors from the deployed position to the folded position is effected by reversing the hydraulic pressure in jack 15, which then draws the doors in rotation around their respective pivots by means of rigid rods 20 and 21. When upstream fingers 28 and 29 come into contact with hooks 26 and 27, respectively, the hooks swing around and lock onto them.

According to the present invention, the extended position can be attained, irrespective of whether starting from the position illustrated in FIG. 1, or that illustrated in FIG. 2.

Figure 4:
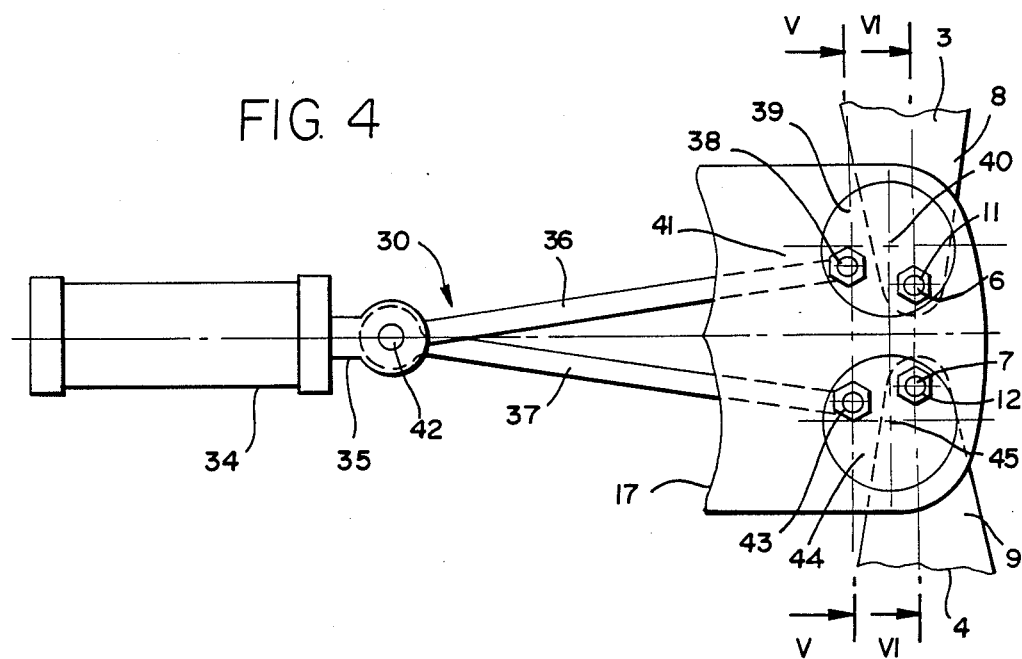
FIG. 4 presents a particular embodiment of displacement means which permit variation of the throat area of the nozzle.
Figure 5:
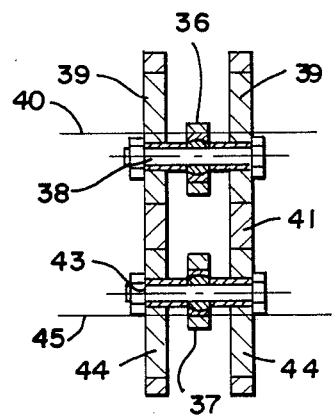
FIGS. 5 and 6 are cutaway cross-sectional views, along lines V—V and VI—VI, respectively, of FIG. 4.
Figure 6:
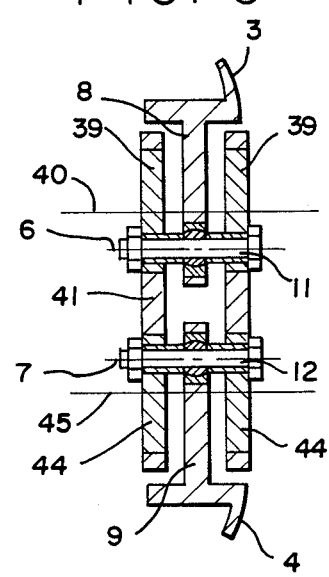

In the first variation of the embodiment, displacement means 30, shown in FIGS. 4–6 which correspond to Zone A of FIG. 1, is capable of being set into motion by the action of an auxiliary jack 34, connected to an arm 17, partially shown, extending from fixed nozzle 1. The slidable rod 35 of jack 34 carries at its end, and around an axis 42, two identical small auxiliary rods 36 and 37. Auxiliary rod 36 is hinged to a spindle 38 inserted into a ring or plate which is pivotally mounted about a common rotation axis 40 on a flange 41 connected to fixed arm 17. Spindle 38 is positioned off-center with respect to the rotating axis of ring 39.

Likewise, by analogy, but symmetrically with respect to the axis of the nozzle, auxiliary rod 37 is attached to a spindle 43 inserted into a ring 44, which is pivotally mounted about a common rotation axis 45 on flange 41, onto which ring 39 is also mounted. Axis 43 is off-centered with respect to rotating axis 45 of the ring 44.

As shown in FIGS. 4 and 5, each of rings 39 and 44 is drawn to corresponding downstream transverse axis 6 or 7. So, each downstream transverse shaft 11 or 12, onto which is disposed the corresponding brace 8 or 9 of door 3 or 4, is fixed at its end to ring 39 or 44. Shaft 11 is positioned off-center with respect to rotation axis 40 of the ring 39. Similarly, shaft 12 is positioned off-center with respect to rotation axis 45 of ring 44.

The operation of the displacement means 30 will be described with reference to FIG. 7, which schematically illustrates in continuous lines the position corresponding to the minimal cross-section S of the throat of the nozzle, and in dotted lines, the position corresponding to the maximum cross-section S1 of the throat of the nozzle.

In FIG. 7, doors 3 and 4 are in a folded position and are locked by hooks 26 and 27 which surround upstream fingers 28 and 29 of the doors. Actuating flanges 19 of jack 15 are in a retracted position. It should also be noted that the positioning of downstream shafts 11 and 12 on respective rings 39 and 44 effects an auto-locking position which does not require hydraulic or pneumatic pressure in auxiliary jack 34 for maintaining the minimal cross-section S for the throat of the nozzle.

The pressurization of jack 34 effects an extension of slidable rod 35 which pushes on auxiliary rods 36 and 37, which in turn drive, according to an angular trajectory but in an opposed sense, spindles 38 and 43 with respect to respective rotating axes 40 and 45 of rings 39 and 44, the rings thus pivoting about their respective axes.

The rotation of the rings is mechanically limited by stops, not shown, which prevent them from advancing beyond the two extreme chosen positions.

In addition to the angular displacement of spindles 38 and 43, angular displacement results of the downstream fingers 11 and 12, connected respectively to rings 39 and 44. In fact, doors 3 and 4, attached respectively to downstream shafts 11 and 12 by braces 8 and 9, are displaced to a position for which the throat of the nozzle has a cross-section S1 corresponding to the condition of desired flight. This position is then maintained by the pressure applied by auxiliary jack 34. The distance "s" indicates the increase of the throat radius of the nozzle.

As one can see from FIG. 7, each rigid rod 20 and 21 of actuating means 14 undergoes an equal displacement, each hinge spindle 22 and 23 of the rods attached to respective braces 8 and 9 being engaged at the time the cross-section of the throat of the nozzle is being modified. In fact, the point of connection of each rod on slidable rod 35 engaged to actuating flange 19 is displaced equally, then freed, since actuating means 14 is not pressurized.

Moreover, "d1" designates the distance between the positions of downstream shafts 11 and 12, when the throat area equals cross-section S, and the position of the same shafts, when the throat equals to cross-section S1. Distance "d1" is projected onto the axis of the nozzle and represents the backward movement of doors 3 and 4. As a consequence, upstream fingers 28 and 29 are equally displaced at the distance "d", illustrated in FIG. 2, with respect to hooks 26 and 27. The configuration of the hooks is capable of achieving this effect, while maintaining locking of the upstream fingers.

To change from the maximum cross-section S1 to the minimum cross-section S for the throat of the nozzle, the delivered initial pressure of auxiliary jack 34 is reduced. Slidable rod 35 is then retracted, either by means of internal spring or by a fluid feed, in the body of the jack, which imparts rotation to rings 39 and 44 by means of respective auxiliary rods 36 and 37. Rings 39 and 44 rotate about their respective axes 40 and 45, thereby returning downstream shafts 11 and 12 to their initial position which corresponds to the minimum cross-section S of the throat of the nozzle.

To change the position illustrated in FIG. 7 to the position illustrated in FIG. 8, corresponding to the deployment of doors 3 and 4 of the thrust reverser for providing braking of the aircraft, upstream fingers 28 and 29 are freed from hooks 26 and 27. Next, principal actuating jack 15 is put under pressure, thereby driving rigid rods 20 and 21, by means of the slidable shaft, to which they are joined.

Thus rods 20 and 21, given their connection to hinge spindles 22 and 23, effect a rotating movement to doors 3 and 4, which pivot about their respective fixed downstream shafts 11 and 12, until trailing edges 31 of the doors come into contact with each other in such a way as to redirect the jet delivered downstream by the jet engine.

In another variation of the embodiment shown in FIGS. 9 and 10, displacement means 30 also comprises an auxiliary jack 34, not shown, which is identical to what was discussed. Two identical rods 36 and 37 are coupled to jack 34. However, the end of each auxiliary rod is attachedly mounted directly onto corresponding downstream shafts 11 and 12. As can be seen from the cut-away view of FIG. 10, downstream shaft 11 carries about its midsection brace 8 of door 3 and, on both sides of the brace, the ends of auxiliary rod 36. The ends of downstream shaft 11 are each disposed in a slot 50 formed in flange 41, which is intimately connected to rigid arm 17 jointed to nozzle 1. Similarly, downstream shaft 12 not only carries brace 9 of door 4, but also the ends of auxiliary rod 37. The ends of downstream shaft 12 are each disposed through a slot 51 formed in flange 41. As is clear from FIG. 9, slots 50 and 51 are shaped in the form of an arch and are symmetrical to the axis of the nozzle.

In the illustrated position, downstream shafts 11 and 12, in stopping against one of the ends of the corresponding slots, are in a position which corresponds to that for which the throat of the nozzle is of a minimum area. To change from the minimum cross-section area to the maximum cross-section area, auxiliary jack 34 is pressurized such that auxiliary rods 36 and 37, which communicate respectively with downstream shafts 11 and 12, effect a rotating movement corresponding to the arched shape of the slots. When shafts 11 and 12 are stopped against the other end of the corresponding slots, the throat of the nozzle has a maximum cross-section S1. The retention of this position is assured by jack 34.

As for the previous variation of the embodiment, upstream fingers 28 and 29 undergo a relative displacement with respect to hooks 26 and 27, respectively.

The way in which the doors are changed from the stowed position to the deployed position is effected identically to the preceding embodiment in that the doors, under the action of auxiliary rods 36 and 37, are pivoted about downstream shafts 11 and 12, which remain fixed.

As was previously stated, displacement means 30, in permitting the opening of the throat of the nozzle for the gas jet derived from the engine to be varied, while doors 3 and 4 of the thrust reverser 2 remain stowed, can be controlled directly by actuating jack 15 of the actuating means 14, which permits the changing of the doors from the folded position, to the deployed position and vice-versa.

In FIG. 11, jack 15 of actuating means 14 is joined to the fixed structure such as the rigid arm by well-known means, not shown. The slidable rod, not shown, of jack 15 comprises two fastening flanges 19, diametrically disposed opposed to each other. On fastening flanges 19 are attached rods 53 and 54, respectively, by means of spindles or shafts 55 and 56. To their opposed ends, rods 53 and 54 are connected to braces 8 and 9, respectively, by way of hinge spindles 22 and 23, as already mentioned. Rods 53 and 54 are of the telescopic type having, for example, an internal spring, not shown, disposed inside each rod. As can be seen, these rods can attain two extreme lengths, maximum and minimum.

As is clear from FIG. 11, the displacement means of each door 3 and 4 comprise respective connecting rod assemblies 58 and 59, to each of which is associated an ensemble of an off-centered ring identical to those used with respect to FIG. 4–6, for which the same reference numbers are used.

Each connecting rod assembly 58 and 59 comprises three small rods 60, 61, 62 and 63, 64, 65 respectively. Thus, small rod 60 is coupled to an extension 66 from spring rod 53; small rod 61 is coupled to spindle 22, thereby attaching itself to spring rod 53 (FIG. 14); and small rod 62 is coupled about spindle 38 (FIG. 23) jointed to the ends of ring 39 mounted pivotally in flange 41 connected to rigid arm 17. The other ends of small rods 60, 61 and 62 are connected about a common axle 67.

Figure 12:
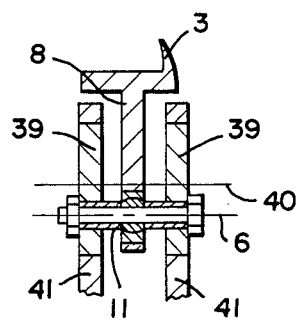
FIG. 12, 13 and 14 are cutaway views along lines XII—XII, XIII—XIII and XIV—XIV, respectively, of FIG. 11.
Figure 13:
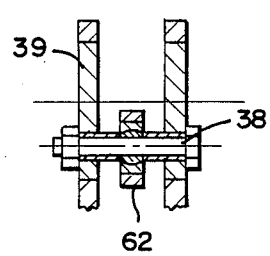
Figure 14:
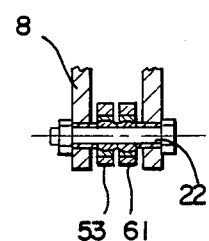
Figure 17:
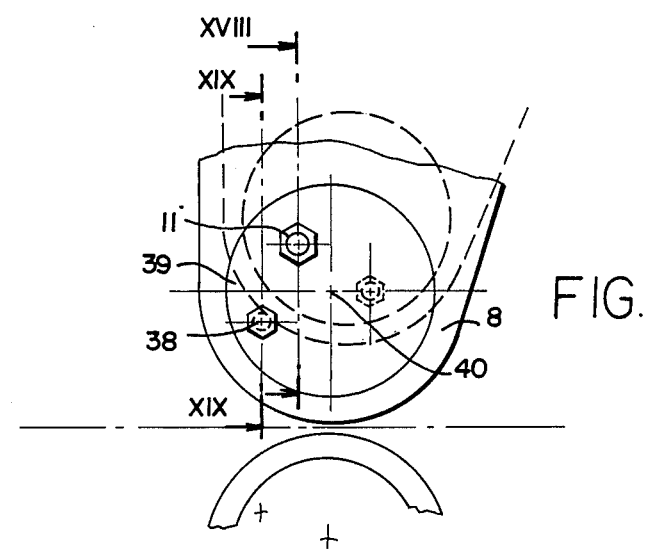
FIG. 17 partially illustrates a varying of the means of the FIG. 11 embodiment.

Spindle 38 is positioned off-center with respect to rotating axis 40 of ring 39, so that downstream shaft 11 carrying brace 8 of door 3 is connected by the ends of ring 39 (FIG. 12). Rod assembly 59 is identical to rod assembly 58, but is disposed symmetrically with respect to the axis of the nozzle. Accordingly, small rod 63 is attached to an extension 69 of spring rod 54, small rod 64 is connected to hinge spindle 23 to which spring rod 54 is coupled, and small rod 65 is connected about spindle 43, which is jointed to the ends of ring 44 mounted pivotally on flange 41. The other ends of small rods 63, 64 and 65 are attached about a common axle 70.

Figure 15:
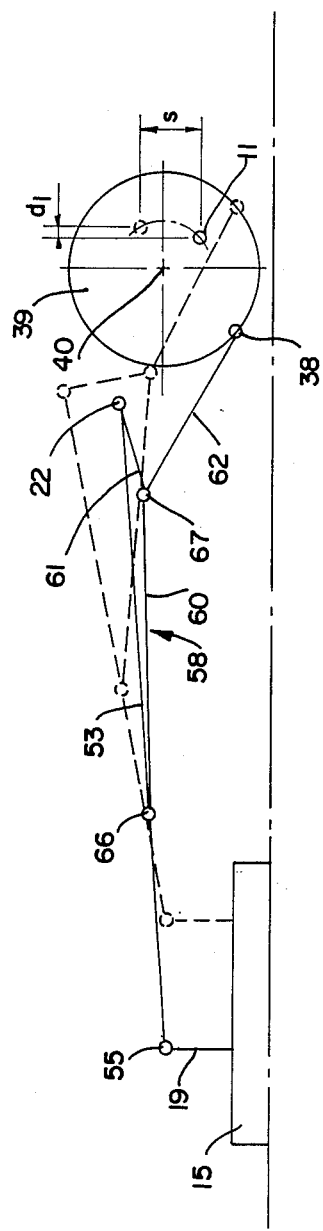
FIG. 15 shows a half-schematic view of the kinematics of operation of the means illustrated by FIG. 11-14, which shows the variation of the throat area of the nozzle.

The kinematics for obtaining the variation of the cross-section of the nozzle orifice is illustrated in FIG. 15, which shows schematically, in half-view, in continuous lines, the position of the doors for which cross-section S is minimal, and, in dotted lines, the position of the doors for which cross-section S1 is maximum.

In the illustrated position with continuous lines, principal spring rods 53 and 54 are at their maximum length, jack 15 being inactive so that the upstream fingers 28 and 29 of the doors 3 and 4 are locked by hooks 26 and 27.

To change the position corresponding to a minimum cross-section (continuous lines) of the throat of the ejection nozzle to the position (dotted lines) corresponding to its maximum cross-sections, jack 15 is pressurized, the upstream fingers being securely locked. When deployed, jack 15 compresses the interior spring of each telescopic rod 53 and 54, whose lengths thus become minimal.

At the start of their reduction, rods 53 and 54 are coupled to rod assemblies 58 and 59, respectively, by respective hinge spindles 22 and 23 and extension 66 and 69. As a result, small rods 62 and 65 of each of the rod assemblies are engaged symmetrically by axles 67 and 70, thereby connecting them respectively to small rods 60, 61, and 63, 64.

These small rods 62 and 65 then impart a rotating movement to rings 39 and 44, with respect to their respective axes 40 and 45, due to spindles 38 and 43 to which they are connected. Rings 39 and 44 are then pivoted in the reverse sense. Thus, downstream shafts 11 and 12, connect to respective rings 39 and 44, also displace them angularly with respect to rotational axes 40 and 45, until shafts 11 and 12, to which doors 3 and 4 are connected, are in a position, previously determined by the fixed mechanical stops, for which the throat of the nozzle has a maximum cross-section.

The distance "s" indicates the increase of the radius of the throat of the nozzle.

As for the first embodiment illustrated in FIG. 7, doors 3 and 4, at the start of the changing from one position to the other, for direct flow of the jet, effects a longitudinal backward movement, which, as a result, displace upstream fingers 28 and 29 with respect to hooks 26 and 27.

For doors 3 and 4 to go from the maximum throat cross-section (dotted lines) to the minimum throat cross-section (continuous lines), the pressure delivered by the jack 15 is suppressed. In effect, the internal spring of each telescopic rod 53 and 54 relaxes in withdrawing to its initial maximum length.

At the start of their extension, rods 53 and 54 draw in simultaneously respective rod assemblies 58 and 59, which, in turn, impart a rotating movement to corresponding rings 39 and 44, so that downstream shafts 11 and 12 are returned to their initial position corresponding to a nozzle throat having a minimal cross-section.

Figure 16:
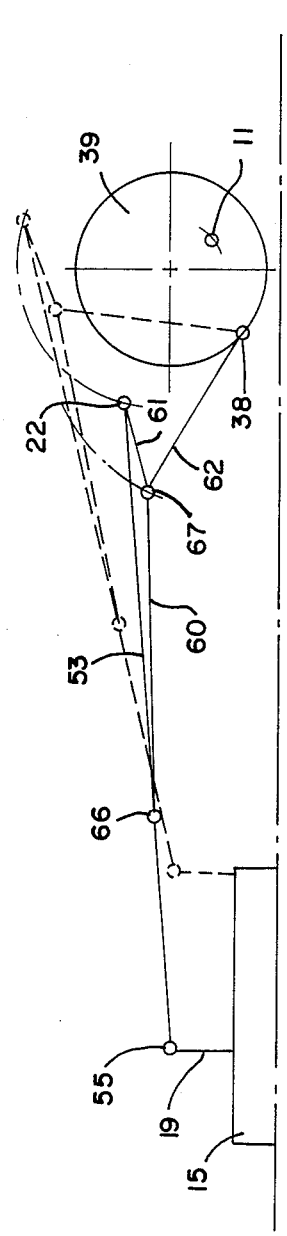
FIG. 16 shows the transition of the doors from the folded position to the extended position in the FIG. 15 embodiment.

In FIG. 16, to change the position of the thrust reverser doors from the direct jet flow position (continuous lines) to the reverse thrust position (dotted lines), upstream fingers 28 and 29 are freed from hooks 26 and 27 of doors 3 and 4, and jack 15 of the actuating means 14 is depressurized.

The doors not being locked, the telescopic rods connected to hinge spindles 22 and 23 are not compressed, and thus work jointly in lieu of the rigid rods. The lengths of the rods then stay at a maximum. The doors then pivot around the shafts 11 and 12, until the trailing edges 31 come in contact, rod assemblies 58 and 59 thus playing a passive role.

As in operation of the chosen rod assembly, rings 39 and 44 can stay fixed or turn, and the pivoting of the two doors in the reverse thrust position can then begin from the position for which the throat of the nozzle has a minimal cross-section, as well as beginning from a position from which the cross-section throat of the nozzle has a maximum cross-section.

Figure 18:
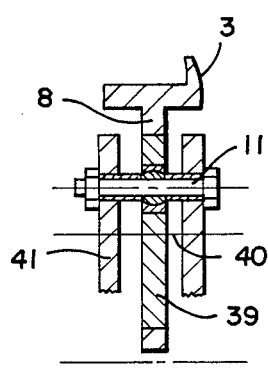
FIGS. 18 and 19 are cutaway views along lines XVIII—XVIII and XIX—XIX, respectively, of FIG. 17.
Figure 19:
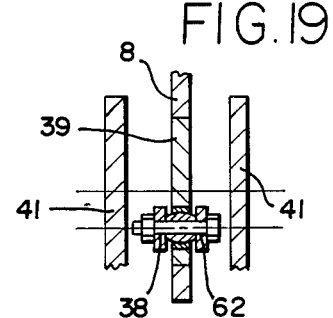

In another embodiment (FIGS. 17-19), the rings are pivotally mounted directly onto braces 8 and 9, respectively. As shown in FIG. 18 which uniquely illustrates coupling of brace 8 to flange 41 (the coupling of brace 9 being identical and symmetrical with respect to the axis of the nozzle), ring 39 is disposed directly in the brace and positioned in an off-center fashion with respect to its axis 40. On one side of ring 39, the ends of downstream shaft 11 are coupled to flange 41; and on the other side of ring 39, small rod 62 is coupled to spindle 38. Rod assembly 58 is identical to rod assembly 58, with spring rod 53 being attached to brace 8.

The operation is similar to that described with respect to FIGS. 15 and 16 and, as a result, will not be clarified further. Nevertheless, the position occupied by ring 39 connected to brace 8 is represented by dotted lines in FIG. 17, when the throat of the nozzle is changed from the minimum cross-section to the maximum cross-section.

Bearing the inventive concept of the present invention in mind, additional embodiments of means for varying the cross-section of the exit opening may be gleaned from FIGS. 20 to 24.

Figure 20:
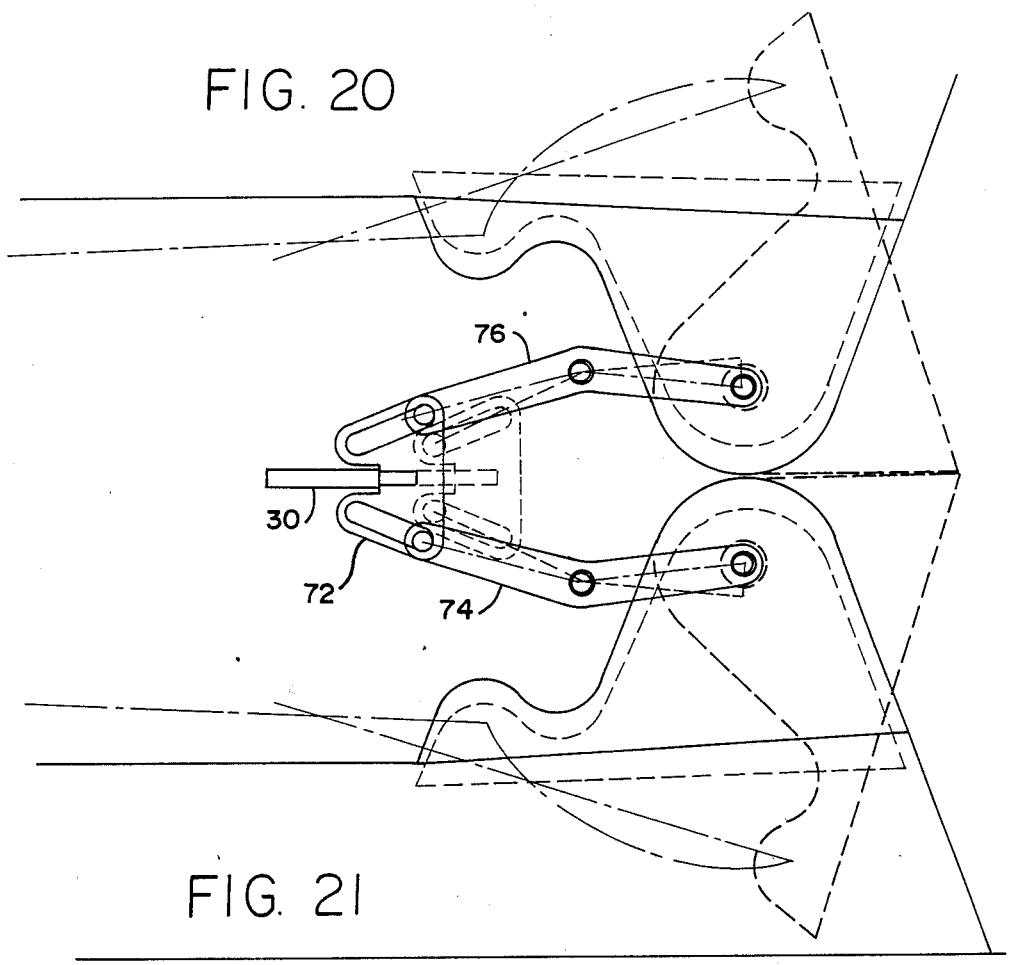

Specifically, with reference to FIG. 20, it can be seen that instead of a slotted plate being positioned at the braces, a slotted plate 72 of the curved guidance type, having the appropriate extensions 74 and 76 attached thereto, is directly coupled to the actuating arm of the actuating means, ie. hydraulic jack 30. Thus, by activating jack 30 to impart a force against plate 72, all things being equal, the cross-sectional area of the throat of the nozzle can be varied as a result of the force being in turn imparted against the thrust reverser doors.

Figure 21:
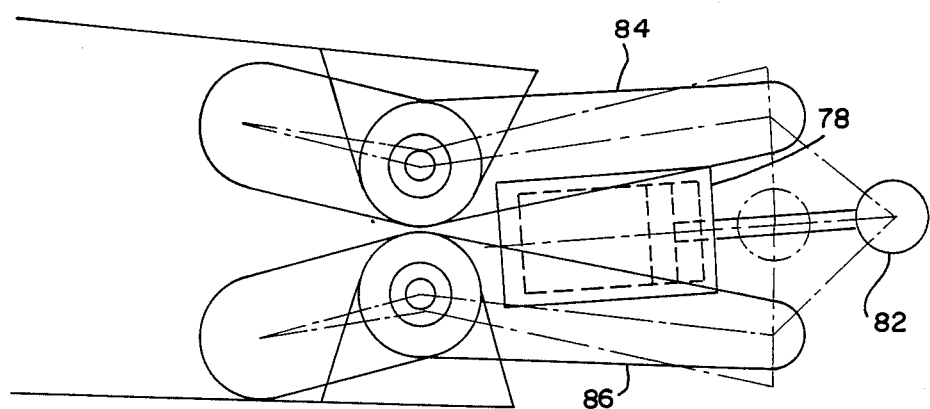

In FIG. 21, the actuating means, in this instance jack 78, is positioned to the rear of (or away from) the thrust reverser doors such that the jet emitted from the engine does not directly hit the actuating arm 80 of the jack. In this embodiment, instead of pulling the thrust reverser doors, the actuating jack actually pushes against a ring 82, which is connected to the doors by means of two extending parts 84 and 86, mounted at the respective pivots of the doors, so as to vary the cross-section of the nozzle throat.

For the FIG. 22 embodiment, in place of two separated extending arms, two overlapping or superposed arms 88 and 90 are used. Since these arms are attached to the actuating arm 92 of the actuation means, when a force is exerted thereagainst, arms 88 and 90 push against the thrust reverser doors, which in turn rotate about their respective pivots, thereby varying the cross-section of the nozzle throat.

Figure 24:
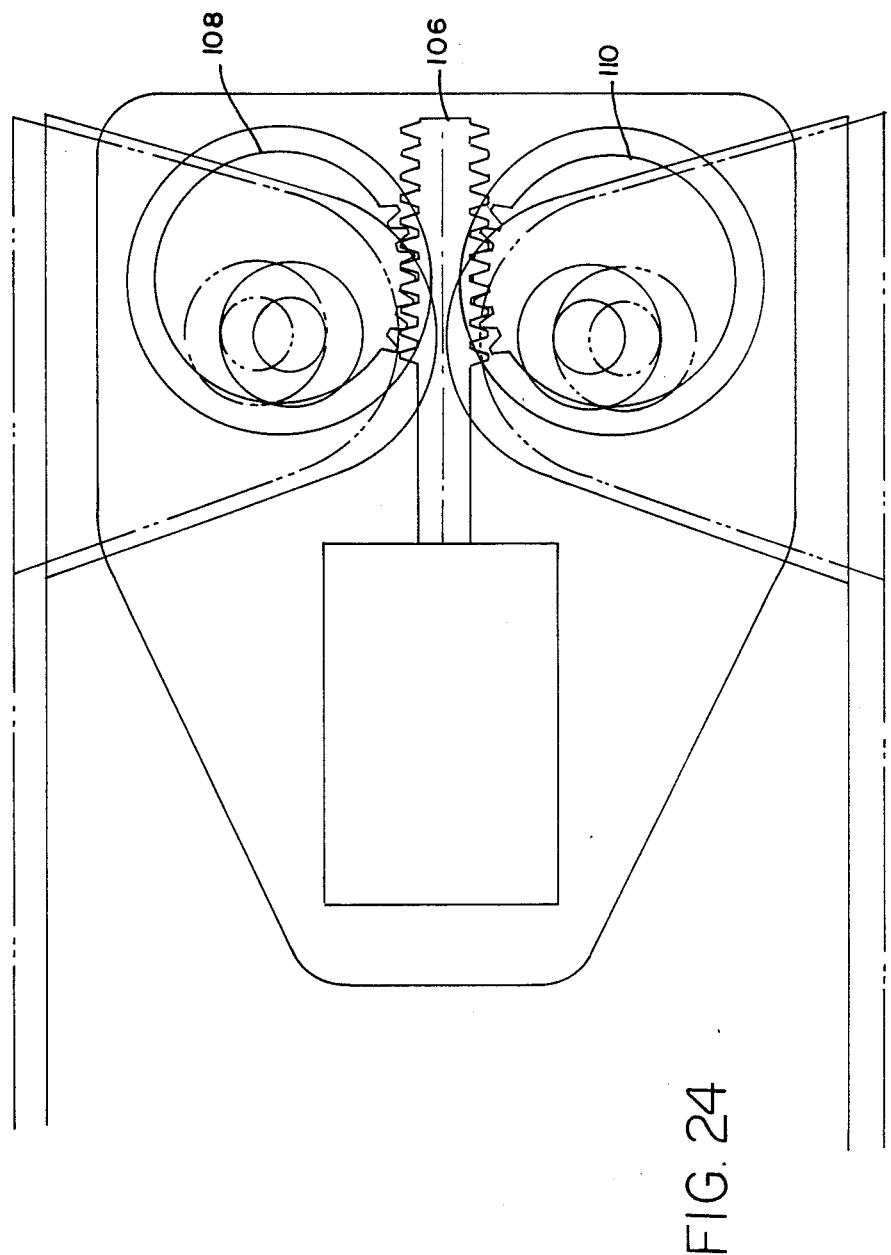

Instead of using hydraulic jacks for either pushing or pulling the thrust reverser doors, via some intermediary means, FIGS. 23 and 24 show examples of drive mechanisms including drive gears. For instance, in the FIG. 23 embodiment, a drive gear is connected to and rotated by an actuating means 96. When rotated, the teeth of drive gear 94, which is engaged to the teeth of respective arms 98 and 100, causes arms 98 and 100 to slowly pivot about their respective pivot axles 102 and 104, thereby causing corresponding movements to the doors, thus varying the cross-sectional area of the nozzle throat.

In a similar vein, the embodiment of FIG. 24 also uses a drive gear 106 for imparting movements to two rings 108 and 110, which are respectively engaged to corresponding thrust reverser doors. Thus, by rotating the rings, the cross-sectional area of the nozzle throat can be varied.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the scope of the intended claims.

We claim

1. An aircraft jet engine comprising:
 (a) a thrust reverser having at least one door pivotable between stowed and deployed positions and defining in its stowed position at least a portion of a throat of an ejection nozzle of the engine, (b) thrust reverser actuator means for operating said door between its respective stored and deployed positions, (c) means for retaining said door in its stowed position, and (d) means independent of said thrust reverser actuator means for selectively moving said thrust reverser door while in its stowed position between at least first and second limiting positions to vary the cross-sectional area of the throat of said ejection nozzle between respective minimum and maximum values;

wherein said door retaining means permits sufficient movement of said thrust reverser door when it is selectively moved between said first and second limiting positions; and whereby said thrust reverser door not only functions when deployed to reverse the thrust of the aircraft engine during a thrust reversing phase of aircraft operation but is also effective while remaining stored to vary the cross-sectional area of the throat of the ejection nozzle of the aircraft engine to thereby permit optimization of engine thrust to suit different engine operating regimes.

2. The jet engine according to claim 1, in which said selectively moving means moves an aftmost portion of said thrust reverser door, while in its stowed inflight positions, away from and toward an aftmost portion of at least another cooperating thrust reversing door to thereby vary the cross-sectional area of the throat of the ejection nozzle of the engine.

3. The jet engine according to claim 1 in which each door is rotationally supported on a pivot member to thereby enable said door to be pivoted between deployed thrust reversing and stowed positions, and said selectively moving means moves said pivot member for each said for to thereby selectively move said door away from and toward the opposing wall ar its aftmost end so as to respectively increase and decrease the cross-sectional area of the throat of said ejection nozzle formed by said door.

4. An engine according to claim 3, wherein said selectively moving means comprises at least one ring pivotally mounted to rotate in a flange connected to said nozzle, each ring having positioned off-center and parallel to its rotating axis on one side of a downstream transverse axis of said nozzle a spindle about which a connecting rod is moved under the action of a driving means for changing, by rotation of said rod, the cross-sectional area of the throat of said ejection nozzle, when said thrust reverser doors are in a stowed and retained position.

5. An engine according to claim 1, wherein said selectively moving means comprises:
an eccentric means coupled to the door at corresponding pivot members thereof;
at least one actuating arm connected to each of the eccentric means at location off-center to the corresponding pivot member for imparting motion to the eccentric means;
whereby the eccentric means, when set to motion by the actuating arms, selectively move the thrust reverser doors angularly about the corresponding pivot members.

6. An engine according to claim 5, wherein wherein said selectively moving means includes a jack, the jack comprises:
a fixed portion connected to said nozzle;
a mobile portion including flanges each of which is coupled to an end of respective rigid rods, the other end of each of the rigid rods being connected to a corresponding one of the doors in proximity to the portion of the doors which form the downstream portion of said nozzle, each of said rigid rods telescopically occupying either a minimum length or a maximum length, in dependence on the operation of said jack, with said doors being retained in the stowed position.

7. An engine according to claim 6, wherein said ring of each of the assemblies is arranged in a respective downstream end of one of said doors.

8. An engine according to claim 5, wherein said selectively moving means comprising:
two connecting rod assemblies each including a plurality of rods having respective first ends being coupled to an axle and respective second ends being coupled to a telescopic rod, to a hinge spindle connected to said door, and to a ring pivotally mounted to rotate in a flange connected to said nozzle, said ring having positioned offcenteredly and in parallel to its rotating axis, on one side, said hinge spindle of the corresponding rod, and the other side, the corresponding thrust reverser door.

9. An engine according to claim 1, wherein said selectively moving means comprises:
a plate having plurality of arcuate slots each for providing guidance to the movement of a corresponding thrust reverser door coupled therethrough to an actuating arm.

10. An engine according to claim 9, wherein said flange containing said arcuate slots is connected to said nozzle, the slots being slidable about a downstream transverse axis of said nozzle by means of respective control rods under the action of a driving means for changing the cross-sectional area of the throat of the ejection nozzle, while said doors are in a stowed and retained position.

11. An engine according to claim 1, wherein said selectively moving means comprises a hydraulic jack.

12. An engine according to claim 1, wherein said thrust reverser actuator means comprises a hydraulic jack.

13. An engine operable in both a direct thrust mode and a thrust reversing mode and having at least two thrust reverser doors movable between a stowed position corresponding to said direct thrust mode of the engine and a deployed position corresponding to said thrust reversing mode, said doors forming a nozzle throat of the engine when said doors are in their stowed position, comprising:
means for pivoting, without translational movement, said thrust reverser doors to said deployed position for thrust reversing in said thrust reversing mode about at least corresponding first pivot centers substantially at a longitudinal plane of the nozzle throat;
means independent from said pivoting means for shifting said first pivot centers to corresponding second pivot centers substantially at the plane of the nozzle throat to vary the distance between respective ends of said doors along an axis transverse to the longitudinal axis of the engine to thereby change the cross-sectional area of the nozzle throat while said doors remain in their stowed position in said direct thrust mode.

14. The engine according to claim 13, further comprising:
   means for retaining said doors in their stowed position so that said doors cannot be accidentally pivoted to said thrust reversing mode, but permitting sufficient movement of said doors when the distance between said respective ends of said doors is varied as said pivot centers are shifted.

15. The engine according to claim 14, wherein said retaining means comprises at lest one hook-like member having retaining portions separated by a given distance to afford said sufficient movement of said doors when said pivot centers are shifted.

16. The engine according to claim 14, wherein, upon being released by said retainer means from their stowed position for deployment to the thrust reversing mode, the thrust reverser doors are pivoted to their fully deployed thrust reversing position without encountering any interference from said retaining means.

17. The engine according to claim 13, wherein said pivoting means comprises a hydraulic jack and extending members associated therewith and movably connected to said doors.

18. The engine according to claim 13, wherein said shifting means comprises an actuator means connected to rotatable eccentric means respectively coupled to each of said doors, said actuator imparting motion to said eccentric means for shifting between said first and second pivot centers while said doors remain in their stowed position.

19. The engine according to claim 18, wherein said actuator means comprises a hydraulic jack.

* * * * *